United States Patent [19]

Smith, Jr.

[11] Patent Number: 5,018,085

[45] Date of Patent: May 21, 1991

[54] COLOR PRINTING SYSTEM USABLE FOR REPRODUCTION OF COMPUTER-GENERATED IMAGES

[75] Inventor: Jack E. Smith, Jr., Independence, Mo.

[73] Assignee: Hallmark Cards, Inc., Kansas City, Mo.

[21] Appl. No.: 207,724

[22] Filed: Jun. 16, 1988

[51] Int. Cl.$^5$ .................... G06F 15/20; G06F 15/62; H04N 9/67

[52] U.S. Cl. .................... 364/526; 358/332; 358/334; 358/80; 364/521; 364/525

[58] Field of Search ............... 364/525, 526, 521–523; 358/332, 334, 244, 78, 280, 80; 340/701, 703, 720; 346/107 R, 110 R

[56] References Cited

U.S. PATENT DOCUMENTS

| | | | |
|---|---|---|---|
| 3,634,611 | 1/1972 | Pugsley et al. | 358/80 |
| 3,739,078 | 6/1973 | Pugsley et al. | 358/80 |
| 4,060,829 | 11/1977 | Sakamoto | 358/80 |
| 4,393,398 | 7/1983 | Horiguchi et al. | 358/80 |
| 4,430,668 | 2/1984 | Miles, Jr. | 358/80 |
| 4,463,373 | 7/1984 | Mikami | 358/80 |
| 4,467,364 | 8/1984 | Konagaya | 358/280 |
| 4,473,849 | 9/1984 | Cool | 358/332 |
| 4,482,917 | 11/1984 | Gaulke et al. | 358/80 |
| 4,524,421 | 6/1985 | Searby et al. | 364/526 |
| 4,536,848 | 8/1985 | d'Entremont et al. | 364/525 |
| 4,573,071 | 2/1986 | Sakamoto | 358/80 |
| 4,627,004 | 12/1986 | Cool et al. | 358/334 |
| 4,639,770 | 1/1987 | Jung et al. | 358/80 |
| 4,556,505 | 4/1987 | Yamada et al. | 358/80 |
| 4,668,980 | 5/1987 | Stansfield et al. | 358/80 |
| 4,689,669 | 8/1987 | Hoshino et al. | 364/526 |
| 4,691,229 | 9/1987 | Colditz et al. | 358/80 |
| 4,694,356 | 9/1987 | Constable | 358/332 |
| 4,695,902 | 9/1987 | Wolcott | 358/332 |
| 4,701,790 | 10/1987 | Yamada | 358/80 |
| 4,704,699 | 11/1987 | Faarina et al. | 364/525 |
| 4,727,425 | 2/1988 | Mayne et al. | 358/78 |
| 4,766,503 | 8/1988 | Lambert et al. | 358/332 |
| 4,794,460 | 12/1988 | Shiota | 358/332 |
| 4,809,198 | 2/1989 | Terashita | 364/525 |
| 4,827,434 | 5/1989 | Hanall et al. | 364/525 |

FOREIGN PATENT DOCUMENTS 0202536 8/1982 European Pat. Off. .
2202708 9/1988 United Kingdom .
2213674 1/1989 United Kingdom .

OTHER PUBLICATIONS

Yule, J. A. C., "Principles of Color Reproduction", New York, John Wiley & Sons, Inc., 1967, pp. 260–266, 319–326.

Hardy, A. C. and Wurzburg, F. L., "Color Correction In Color Printing", Journal of the Optical Society of America, vol. 38, No. 4, Apr. 1948, pp. 300–307.

VGA Card User's Guide (undated).

BYTE Magazine, by Lee Baldwin, "Color Considerations", Sep. 1984, pp. 227, 228, 230, 232, 234, 235, 238, 240, 243, 244, and 246 (11 pages).

Primary Examiner—Kevin J. Teska
Attorney, Agent, or Firm—Neuman, Williams, Anderson & Olson

[57] ABSTRACT

A system is provided for receiving R, G and B data in digital form, such as produced by an artist using a "paint" program on a monitor screen, and converting such data to CMYB data for printing. The system independently determines tone correction values for grey balance control and color values and combines such values to produce a highly accurate reproduction of what is viewed on a screen. Calibration procedures are provided which rapidly converge and which allow quick and accurate adjustment, such as may be required to match a particular monitor and printing inks.

8 Claims, 4 Drawing Sheets

COLOR PRINTING SYSTEM USABLE FOR REPRODUCTION OF COMPUTER-GENERATED IMAGES

BACKGROUND OF THE INVENTION

1. Field of the Invention

This invention relates to a color printing system and more particularly to a system which is usable for accurate and reliable reproduction of images generated by computers and displayed on color monitors. The system of this invention produces prints which have an accurate visual match to original images produced on a color monitor screen. The system is easy to use and makes possible the use of calibration procedures which directly and quickly converge to an accurate calibration.

2. Background of the Prior Art

Various methods have heretofore been used or proposed for reproducing images of a type which are generated by an artist on a color monitor screen of a computer using "paint" programs and the like. One method which has been used involves the sending of a digital image to a color film recorder to produce a transparency which is then placed on a conventional color separation scanner for processing of color separation half-tone films for making lithographic printing plates. This type of operation is cumbersome and more importantly, does not reliably produce an accurate color reproduction.

There have also been a number of proposals for converting red, green and blue or "RGB" values to cyan, magenta, yellow and black or "CMYK" values, ostensibly appropriate for use with a computer system. However, the conversion methods as proposed in the prior art have been quite complicated and cumbersome and are such that it would appear to be very difficult to obtain reliable results in attempting to convert computer-generated or similar signals to signals appropriate for color print reproductions.

SUMMARY OF THE INVENTION

This invention was evolved with the general object of providing a system for quick and accurate conversion of data such as supplied to a computer monitor screen into data for control of printing operations, to obtain accurate reproduction of an original image.

In accordance with the invention, a system is provided in which chromatic output values are derived from the values of the component colors of a pixel of an original image such as produced on a screen of a color monitor. An important feature is in the generation of tone correction values which are used in producing the chromatic output values and which are such as to provide a grey balance throughout a full range of greys. Preferably, and in accordance with an important feature of the invention, the tone correction values are determined through look up tables.

The system is such that an accurate grey balance is obtainable from color inks, without a black ink, and through a range which is quite wide. This feature facilitates the achievement of an accurate reproductions of colors through wide ranges of colors. Preferably, black is added to provide optimum contrast and otherwise facilitate an accurate reproduction of the original image. In accordance with the invention, black is added as a function of a grey factor corresponding to the screen color which has the lowest effective intensity value.

After obtaining an accurate grey balance, color correction systems are usable to provide accurate reproduction of colors of an original image. Color correction values are developed which preferably include scale values which operate in a linear fashion to obtain a balance which is close to the optimum balance. In addition, the color correction values include selective values which are added to obtain the optimum balance and highly accurate reproduction of colors. The selective values operate with respect to the screen and ink colors and are also preferably operative with respect to selected other colors such as light red, purple and brown.

Important features relate to the use of a view box for viewing a reproduction in side-by-side relation to a monitor screen under standard lighting conditions.

Additional important features relate to calibration procedures which are readily followed and which provide for a rapid convergence to an accurate calibration of the system and highly reliable reproductions of original images.

This invention contemplates other objects, features and advantages which will become more fully apparent from the following detailed description taken in conjunction with the accompanying drawings.

DESCRIPTION OF A PREFERRED EMBODIMENT

Figure 1:
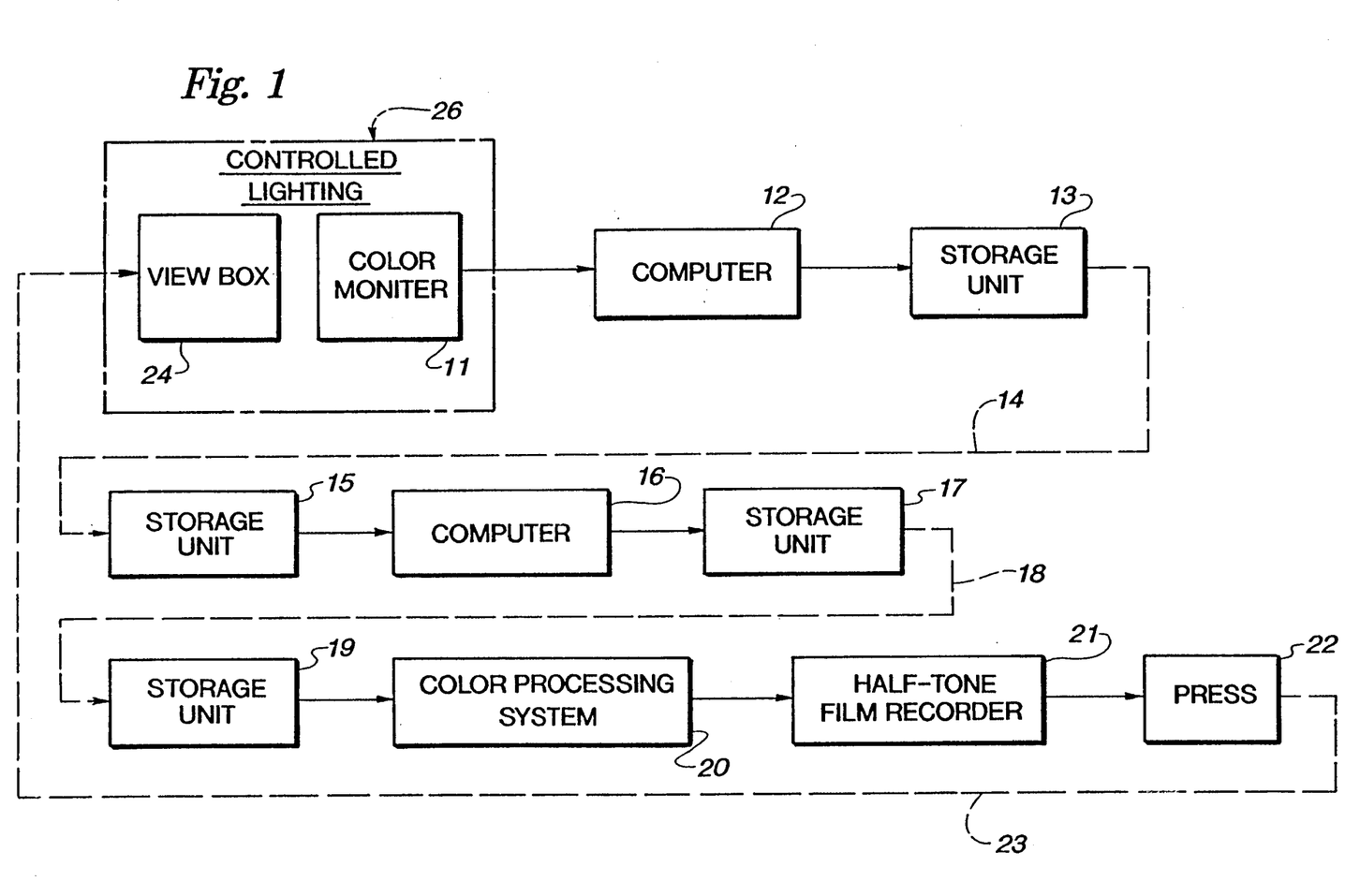
FIG. 1 is a schematic block diagram of a color print reproduction system usable in the practice of the invention.
Figure 2:
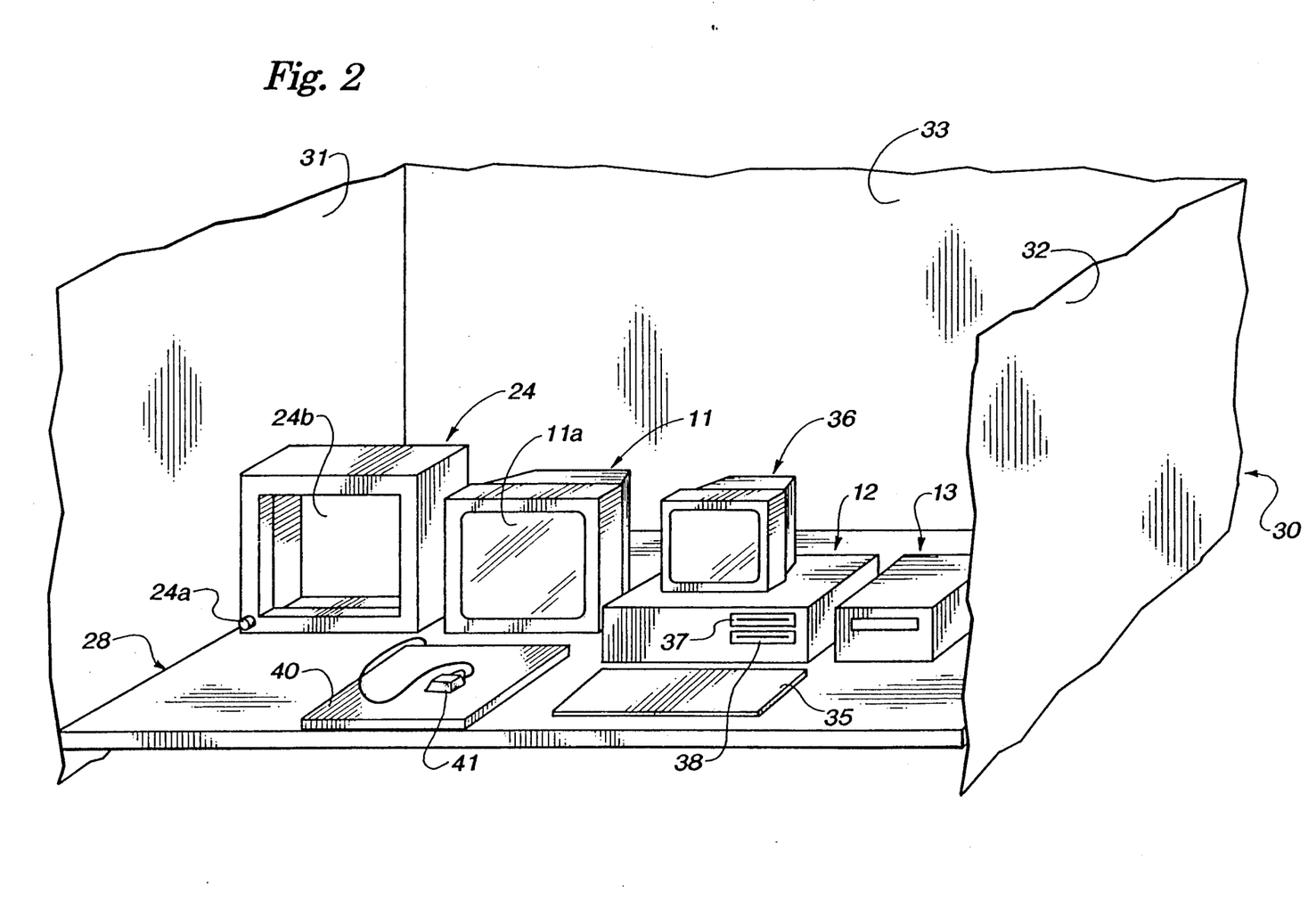
FIG. 2 illustrates a physical arrangement of a computer, monitor and view box for use in the practice of the invention.

In FIG. 1, reference numeral 10 generally designates a system usable in the practice of the invention. An original image of a desired form is produced on the screen of a color monitor 11 using a computer 12, in a arrangement such as shown in FIG. 2 and as hereinafter described. Data as to the stored image, in the form of a group of red, green and blue pixel data, are then stored on a suitable storage medium, such as a magnetic tape, using a storage unit 13. As indicated by dotted line 14, the tape or other storage medium may then be physically transferred to a storage unit 15 which is then operated to transfer the data from the storage medium to the memory of a second computer 16. Computer 16 processes the red, green and blue pixel data and develops output data for use in reproduction of the image, the computer 16 being supplied with calibration data which define the relationship of characteristics of the monitor 11 and known or assumed characteristics of inks to be used in a half-tone reproduction of the original image.

The output data developed by the computer 16 includes data defining the black component and at least three color components for control of half-tone reproduction of the image. For example, the output data may control cyan, magenta and yellow inks, in addition to black ink. However, the invention is also usable for control of printing processes which use additional inks such as light cyan and pink inks, for example, and is not limited to control of four ink processes.

The output data produced by the computer 16 may be stored by a storage unit 17 on a suitable medium which, as indicated by dotted line 18, may then physically be transferred to another storage unit 19. Storage unit 19 is operative to read out the output data a standard type of color processing system 20 which is coupled to a halftone film recorder 21. Films produced by the recorder 21 are then used to produce one or more reproductions, using a press 22 which may be either a production press or a proof press.

As indicated by dotted line 23, a reproduction produced by the press 22 may then be physically transferred to a view box 24 for side-by-side comparison with the original image on the color monitor 11. Both the view box 24 and the color monitor 11 are preferably subjected to a standard lighting condition, as indicated by the broken line rectangle 26 in FIG. 1. If the reproduction image does not accurately correspond to the original image, procedures as hereafter described may be used to make changes in the calibration data which are supplied to the computer 16 and to obtain a more accurate reproduction. Once satisfactory reproductions are obtained and the reliability of the calibration data is established, reproductions of other original images may be generated.

The system is also arranged for storage of calibration data in a file along with an identification of the particular inks which are used, filed calibration data being thereafter retrievable for use by the computer 15 whenever the same inks are subsequently used. The filed calibration data may also be retrieved to provide initial calibration data when ink combinations are used which have not been used previously but which are similar to those identified in the file.

FIG. 2 shows how the monitor 11, computer 12, storage unit 13 and view box 24 may be physically arranged on a table 28 and in a room or enclosure 30 which includes side walls 31 and 32, a rear wall 33. Indirect lighting, not shown, provides the aforementioned standard lighting condition 26. The surfaces of the walls 31-33 may preferably be of a neutral color with flat, non-reflective characteristics and the indirect lighting is so used as to avoid reflections from the surfaces of a screen 11a of the color monitor as well as from the view box 24 and a reproduction disposed therewithin. The lighting should be quite dim but sufficient to avoid excessive contrast between the screens 11a and the reproduction and the background wall surfaces.

The view box 24 preferably has standard 5000K lamps which are variable in intensity using an intensity control knob 24a. Such lamps may for example be fluorescent lamps hidden behind wall portions which define four peripheral edges of an open rectangular front window of the box 24, the reproduction being disposed against a rear wall 24b of the box 24, to be uniformly illuminated by the lamps in generally side-by-side relationship to the original image on the monitor screen 11a.

As is also shown in FIG. 2, the computer 12 is connected to a keyboard 35 and also to a status monitor 36. Computer 12 preferably includes disc drives 37 and 38 for receiving transportable discs and it may preferably also include a hard disc drive. In addition, the computer 12 may be connected to a graphics tablet 40 and associated puck 41, usable by an artist to develop a desired image on the screen 11a of color monitor 11, using a standard type of "paint" software. A scanner, not shown, may also be provided for scanning existing graphics and producing a corresponding image on the screen 11a for editing by the artist as desired. A computer graphics arrangement of this type is very flexible and allows an artist to make changes easily and rapidly produce original images of a form desirable for reproduction.

In the practice of the invention, calibration programs may be loaded into the computer 12 for generation or editing of calibration data files which may be loaded and saved from and to a hard disc of computer 12 and/or transportable discs placed in disc drives 37 or 38. During calibration, original test images may be developed on the monitor screen 11a, for comparison with reproductions of such original test images which have been produced with the system of the invention and which are placed in the view box 24. The system of the invention facilitates an orderly calibration procedure such that errors are readily and quickly detected and corrected to directly converge to an accurate calibration for any particular combination of inks used in the reproduction process. Then the calibration data file may be stored and retrieved for use whenever that particular combination of inks is subsequently used.

Figure 3:
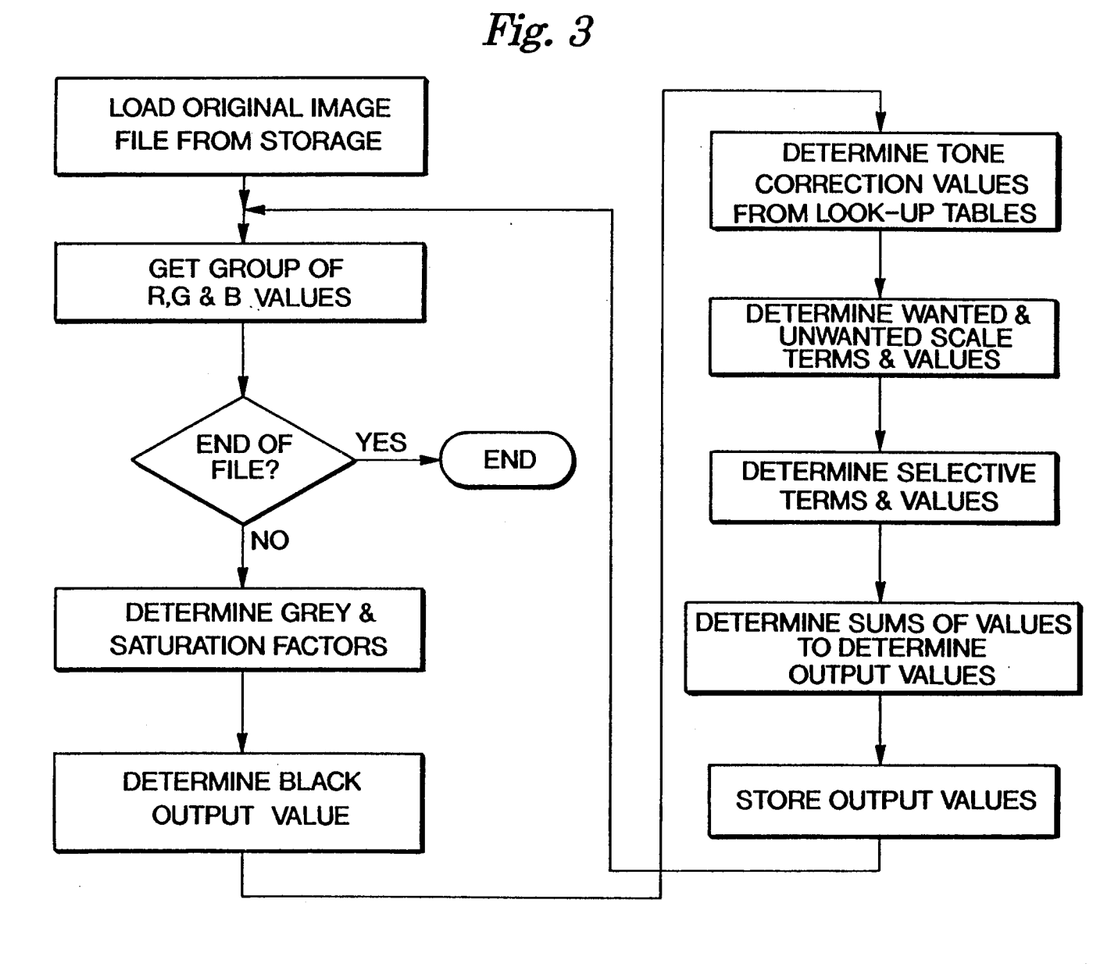
FIG. 3 is a flow diagram illustrating processing operations performed in accordance with the invention.

FIG. 3 is a flow diagram illustrating the digital processing operations performed by the computer 16 in the illustrated system 10. Initially, an original image file is loaded into the memory of the computer 16 from the storage unit 15 and is organized into sequential groups of pixel data, in an order corresponding to that required by the color processing system 20. Each group of pixel data contains sequential R, G and B groups of data which are 8 bit bytes in the system as described herein, each having a decimal value of from 0 to 255 and each defining the effective intensity of the corresponding component color of the pixel. It will be understood that the system is not limited to use of data in the form of 8 bit bytes and groups of data with a greater or lesser number of bits may be used.

Such numeric values of the pixel data bytes are referred to herein as the R, G and B values or collectively as the RGB values. In the system as described herein and as is conventional, they have a complementary or inverse relationship to actual intensity, i.e., a zero value corresponds to a maximum actual intensity of the component color and a value of 255 corresponds to a minimum actual screen intensity of the component color. Maximum values for all three RGB values correspond to a black pixel and minimum values for all three RGB values correspond to a white pixel. If two of the RGB values are maximum values and the third is zero, the corresponding pixel is of one color at maximum saturation.

After loading of group of pixel data and testing for an end-of-file marker, grey factor and saturation factor determinations are made. The grey factor corresponds to whichever of the red, green or blue component colors of a pixel has the lowest intensity, i.e., to whichever of the RGB values is the highest. The saturation factor corresponds to whichever of the red, green or blue component colors has the highest intensity, i.e. to whichever of the RGB values is the lowest.

In the operation as shown, the next step is to determine the black output value which is a function of the difference between a fixed value and the product of the grey factor and a black calibration value. For example, a certain shade of grey, or an approximation thereof, may be produced on the screen 11a when all three RGB values are 200 and a darker shade of grey, or an approximation thereof, may be produced when all three RGB values are reduced from 200 to 100. The grey factor in this example is reduced from 200 to 100 and the black output value is increased since it is a function of the difference between a fixed value and the grey factor, the result being the use of an increased percentage of black ink for the pixel of the reproduction. Preferably, a black value is added as necessary or desirable for contrast, but the system is such that an accurate grey balance is achievable over a wide range from the chromatic output values alone.

For control of color components in the system of the invention, chromatic output values are developed, such values being used for control of cyan, magenta and yellow inks and being designated as C, M and Y values or collectively as CMY values. Each of such chromatic output values is a result of a summation of a plurality of color values which are derived from the RGB values under control of calibration values.

The operation of the system is advantageously based in part upon an assumed approximate relationship of the CMY ink colors to the RGB screen colors. The assumed relationship is that cyan is the negative or inverse of red, that magenta is the negative or inverse of green and that yellow the negative or inverse of blue. In determining each of the CMY values, one of the RGB values has an inverse relation thereto and is used as a primary value. In particular, the R, G and B values are used as primary values for determination of the C, M and Y output values, respectively, and facilitate determination of values to obtain an approximate color match. The other two of the RGB values are treated as secondary values in each case and are used in combination with the grey and saturation factors to determine values for obtaining a more accurate and reliable color match.

Tone correction color values are determined as a next step in the system as illustrated. It is found to be highly desirable that the system be capable of achieving an accurate grey balance from the color output values alone, throughout a wide range to facilitate calibration of the system for accurate reproduction of colors throughout the full ranges of saturations thereof.

An approximate grey balance typically results when magenta and yellow inks are applied in direct proportion to the cyan ink throughout the range, with factors of proportionality in the range of from 0.7 to 0.9. Based upon such results, a tone correction value which is in direct or linear proportion to the primary inverse RGB value may be used for determination of each of the CMY output values and to obtain a satisfactory tone correction in most cases. However, it is found that greater accuracy is achieved by generating a value which has a non-linear relationship to the primary inverse RGB value, and in the system as disclosed herein, R, G and B look up tables are provided which contain values corresponding to all possible RGB values term. Preferably, the values in the look up tables may be changed in an editing or calibration process to obtain a reproduction which has an appearance which accurately corresponds to an original grey scale produced on the color monitor 11a.

The next step in the operation as shown in FIG. 3 is to determine color values as functions of calibration values and of the RGB values and the aforementioned grey and saturation factors which have been derived from such RGB values. For each output color, a scale value may be developed having a linear relationship to the primary inverse RGB color value. A preferred method is based upon a concept of wanted and unwanted colors. In printing cyan, blue and green as well as cyan are wanted colors, whereas red as well as magenta and yellow are unwanted. In printing magenta, red and blue as well as magenta are wanted, whereas green as well as cyan and yellow are unwanted. In printing yellow, red and green are wanted, whereas blue as well as cyan and magenta are unwanted.

In a method of the invention, if the primary inverse color value is equal to the saturation factor, indicating an unwanted relationship to the output color, an unwanted scale term is developed which corresponds to the difference between the primary inverse color value and the grey factor, the unwanted scale term being zero when the primary inverse color value is not equal to the saturation factor. A scale value corresponding to the product of the unwanted scale term and a calibration value may then be used to reduce the output value.

If on the other hand, the primary inverse color value is equal to the grey factor, indicating that there may be a wanted relationship to the output color, a wanted scale term is developed which corresponds to the difference between the primary inverse color value and the saturation factor, the wanted scale term being zero when the primary inverse color value is not equal to the grey factor. A scale value corresponding to the product of the wanted scale term and a calibration value may then be used to increase the output value.

With the use of such wanted and unwanted scale terms and with the optimum calibration values, a satisfactory reproduction may be obtained in many cases. However, in accordance with further features of the invention, additional values are developed to be included in a summation to determine the CMY output values. In particular, selective terms are generated which have the effect of isolating individual colors and which may be multiplied by calibration values to increase or decrease the isolated individual color. A selective term is developed for each RGB color and which is zero if the RGB value for the color is greater than those of the other two RGB values, i.e., if the effective value is less than those of the other two values. In the system as disclosed herein, terms are developed for each screen color which increase as a function of the square of the RGB value of the color and which becomes very large when the RGB value of the screen color is large in relation to the RGB value of the other two screen colors. In addition, terms are developed for the cyan, magenta and yellow ink colors, which increase as a function of the square of the differences between the RGB value of the primary inverse screen color and the RGB values of the other two screen colors. Further, to effectively isolate certain colors (specifically, a light red color, a purple color and a brown color), terms are developed which increase as a function of the third or fourth power of the RGB value of a related screen color.

Under control of the calibration values which are mulitplied by such terms, the calibrator of the system may readily obtain a sharp increase or decrease in the isolated color, when required in order that the reproduction will match the original screen image.

The operation of the system may be clarified by reference to the following Table I which is a listing of a key portion of a program of the system, written in the C program language.

TABLE I

| Line No. | |
|---|---|
| 1 | db = *sourcePtr--; /* pick up the blue |
| 2 | value */ |
| 3 | dg = *sourcePtr--; /* get the green */ |
| 4 | dr = *sourcePtr--; /* get the red */ |
| 5 | /* check if current values have not changed from last |
| 6 | time through */ |
| 7 | if ((dr != sourcePtr[4]) \|\|(dg != sourcePtr[5]) \|\| |
| 8 | (db \|= sourcePtr[6]) \|\| (cnt == 0)) |
| 9 | { |
| 10 | /* since still RGB, highest value is grey factor |
| 11 | */ |
| 12 | (dr >= dg && dr >= db) ? (gf = dr) : ((dg >= dr |
| 13 | && dg >= db) ? |
| 14 | (gf = dg) : (gf = db)); |
| 15 | /* and the lowest value is the saturation factor |
| 16 | */ |
| 17 | (dr <= dg && dr <= db) ? (sf = dr) : (dg <= dr |
| 18 | && dg <= db)? |
| 19 | (sf = dg) : (sf = db)); |
| 20 | /*              Calculate black value |
| 21 | (BLKLEN is set in ChangeBlk() if the default of 2.0 |
| 22 | is not used) */ |
| 23 | dk = 255 - (BLKLEN * gf); |
| 24 | if( dk < 1) |
| 25 | dk = 0; |
| 26 | /*Define the formulas for the various color- |
| 27 | corrections */ |
| 28 | if ((dg < db) && (dg < dr)) |
| 29 | LTRED = (db - dg) * (dr - dg) * dg * dg; |
| 30 | |
| 31 | else LTRED = 0.0; |
| 32 | if ((dr > db) && (dr > dg)) |
| 33 | RED = (dr - db) * (dr - dg); |
| 34 | else |
| 35 | RED = 0.0; |
| 36 | if ((dg < db) && (dg < dr)) |
| 37 | MAG = (db - dg) * (dr - dg); |
| 38 | else |
| 39 | MAG = 0.0; |
| 40 | if ((db < dg) && (db < dr)) |
| 41 | YELL = (dg - db) * (dr - db); |
| 42 | else |
| 43 | YELL = 0.0; |
| 44 | if ((dg > dr) && (dg > db)) |
| 45 | GRN = (dg - dr) * (dg - db); |
| 46 | else |
| 47 | GRN = 0.0; |
| 48 | if ((dr < dg) && (dr < db)) |
| 49 | CYN = (dg - dr) * (db - dr); |
| 50 | else |
| 51 | CYN = 0.0; |
| 52 | if ((db > dr) && (db > dg)) |
| 53 | BLU = (db - dr) * (db - dg); |
| 54 | else |
| 55 | BLU = 0.0; |
| 56 | if((255 - dr) * dr > dg * dg) |
| 57 | PURP = ((255.0 - dr) * dr - dg * dg) * db; |
| 58 | else |
| 59 | PURP = 0.0; |
| 60 | if (2.0 * dr > dg + db) |
| 61 | BRN = (2.0 * dr - db-dg) * (255.0 - gf); |
| 62 | else |
| 63 | BRN = 0.0; |
| 64 | if (dr == sf) |
| 65 | CBCOL = gf - dr; |
| 66 | else |
| 67 | CBCOL = 0.0; |
| 68 | if (dr == gf) |
| 69 | CWCOL = dr - sf; |
| 70 | else |
| 71 | CWCOL = 0.0; |
| 72 | if (dg == sf) |
| 73 | MBCOL = gf - dg; |
| 74 | else |
| 75 | MBCOL = 0.0; |
| 76 | if (dg == gf) |
| 77 | MWCOL = dg - sf; |
| 78 | else |

TABLE I-continued

| Line No. | |
|---|---|
| 79 | MWCOL = 0.0; |
| 80 | if (db = = sf) |
| 81 | YBCOL = gf − db; |
| 82 | else |
| 83 | YBCOL = 0.0; |
| 84 | if (db = = gf) |
| 85 | YWCOL = db − sf; |
| 86 | else |
| 87 | YWCOL = 0.0; |
| 88 | */ color-correction calculation for cyan */ |
| 89 | if (dr > 255) |
| 90 | { |
| 91 | dr = 255; |
| 92 | } |
| 93 | if (dr < 0) dr = 0; |
| 94 | intfer = (int) dr; |
| 95 | xfer = redLUT[intfer]; |
| 96 | rredpix = (double) xfer |
| 97 | + (CORR[CYAN][LRTERM] * LTRED) |
| 98 | + (CORR[CYAN][RTERM] * RED) |
| 99 | + (CORR[CYAN][GTERM] * GRN) |
| 100 | + (CORR[CYAN][BLUTERM] * BLU) |
| 101 | + (CORR[CYAN][CTERM] * CYN) |
| 102 | + (CORR[CYAN][YELLTERM] * YELL) |
| 103 | + (CORR[CYAN][MTERM] * MAG) |
| 104 | + (CORR[CYAN][BRNTERM] * BRN) |
| 105 | + (CORR[CYAN][PURPTERM] * PURP) |
| 106 | + (CORR[CYAN][BCTERM] * CBCOL) |
| 107 | + (CORR[CYAN][WCTERM] * CWCOL); |
| 108 | if (rredpix > 255) |
| 109 | { |
| 110 | rredpix = 255; |
| 111 | } |
| 112 | if (rredpix < 0) rredpix = 0; |
| 113 | redpix = (unsigned char) rredpix; |
| 114 | */ color-correction calculation for magenta */ |
| 115 | if (dg > 255) |
| 116 | { |
| 117 | dg = 255; |
| 118 | } |
| 119 | if (dg < 0) dg = 0; |
| 120 | intfer = (int) dg; |
| 121 | xfer = greenLUT[intfer]; |
| 122 | rgreenpix = (double) xfer |
| 122 | + (CORR[MAGENT][LRTERM] * LTRED) |
| 124 | + (CORR[MAGENT][RTERM] * RED) |
| 125 | + (CORR[MAGENT][GTERM] * GRN) |
| 126 | + (CORR[MAGENT][BLUTERM] * BLU) |
| 127 | + (CORR[MAGENT][CTERM] * CYN) |
| 128 | + (CORR[MAGENT][YELLTERM] * YELL) |
| 129 | + (CORR[MAGENT][MTERM] * MAG) |
| 130 | + (CORR[MAGENT][BRNTERM] * BRN) |
| 131 | + (CORR[MAGENT][PURPTERM] * PURP) |
| 132 | + (CORR[MAGENT][BCTERM] * MBCOL) |
| 133 | + (CORR[MAGENT][WCTERM] * MWCOL); |
| 134 | if (rgreenpix > 255) |
| 135 | { |
| 136 | rgreenpix = 255; |
| 137 | } |
| 138 | if (rgreenpix < 0) rgreenpix = 0; |
| 139 | greenpix = (unsigned char) rgreenpix; |
| 140 | */ color-correction calculation for yellow */ |
| 141 | if (db > 255) |
| 142 | { |
| 143 | db = 255; |
| 144 | } |
| 145 | if (db < 0) db = 0; |
| 146 | intfer = (int) db; |
| 147 | xfer = blueLUT[intfer]; |
| 148 | rbluepix = (double) xfer |
| 149 | + (CORR[YELLOW][LRTERM] * LTRED) |
| 150 | + (CORR[YELLOW][RTERM] * RED) |
| 151 | + (CORR[YELLOW][GTERM] * GRN) |
| 152 | + (CORR[YELLOW][BLUTERM] * BLU) |
| 153 | + (CORR[YELLOW][CTERM] * CYN) |
| 154 | + (CORR[YELLOW][YELLTERM] * YELL) |
| 155 | + (CORR[YELLOW][MTERM] * MAG) |
| 156 | + (CORR[YELLOW][BRNTERM] * BRN) |
| 157 | + (CORR[YELLOW][PURPTERM] * PURP) |
| 158 | + (CORR[YELLOW][BCTERM] * YBCOL) |
| 159 | + (CORR[YELLOW][WCTERM] * YWCOL); |

TABLE I-continued

| Line No. | |
|---|---|
| 160 | if (rbluepix > 255) |
| 161 | { |
| 162 | rbluepix = 255; |
| 163 | } |
| 164 | if (rbluepix < 0) rbluepix = 0; |
| 165 | bluepix = (unsigned char) rbluepix; |
| 166 | *destPtr-- = (unsigned char) dk; /* put black |
| 167 | value in buffer */ |
| 168 | *destPtr-- = bluepix; |
| 169 | *destPtr-- = greenpix; |
| 170 | *destPtr-- = redpix; |

With regard to lines 1-4 of TABLE I, db, dg and dr are the RGB values, in reverse order, such values being from zero to 255 decimal and having an inverse relationship to the intensity of the pixel on the monitor screen 11a. Such values are obtained from memory, after loading and processing a screen file. In lines 5 through 19, a check is made to see if the values have not changed since the last entry. If they have not changed, a grey factor gf and a saturation factor sf remain the same, but if there has been a change, the grey factor gf is set equal to the highest of the RGB values, i.e., the highest of the dr, dg and db values while the saturation factor sf is set equal to the lowest of such values.

The next step at lines 20-25 is to calculate a black value dk which is made equal to a constant (255) minus the product of a calibration term "BLAKEN" and the grey factor gf.

Next, at lines 28 through 87, the various color correction or calibration term are defined. Such terms are thereafter multiplied by various calibration terms to produce values which are summed to produce the final output values.

For example, the color correction calculation for cyan appears at lines 89 through 113. For tone correction, a variable "intfer" is set equal to the integer value of the R value dr and is used to produce a variable "xfer" from a look up table "redLUT". The scale factor terms are the last two terms, at lines 106 and 107. These are obtained by multiplying a correction or calibration term "CORR[CYAN][BCTERM]" by a scale term "CBCOL" and multiplying another calibration term "CORR[CYAN][WCTERM]" by "CWCOL".

In the program, such scale terms "CBCOL" and "CWCOL" for cyan were previously determined at lines 64 through 71. If the RGB value of the primary inverse color related to cyan, i.e., the R value dr, is equal to the saturation factor sf, the scale term "CBCOL" is made equal to the grey factor gf minus the R value dr, the scale factor being otherwise zero. If, however, (lines 68-71) the RGB value of the primary inverse color related to cyan, i.e., the R value dr, is equal to the grey factor gf, the scale term "CWCOL" is made equal to the saturation factor sf minus the R value dr, the scale factor being otherwise zero.

The aforementioned selective terms which are generated for isolation of individual colors are the selective terms appearing at the end portions of lines 97-105, such selective terms being multiplied by corresponding correction or calibration values as indicated in the initial portions of each of lines 97-105. In the program, such selective terms were previously determined at lines 28-63 of Table I. As aforementioned, such selective terms are developed for each screen color and they increase as a function of the square of the RGB value of the color.

For example, with reference to lines 32-35, if the R value dr is greater than both the G and B values dg and db, a selective term "RED" is made equal to the product of the differences between the R value and the G and B values, the term "RED" being otherwise equal to zero. The result is that "RED" is a selective term which is relatively small when there are only small differences between the R value and the other two values but which becomes quite large as the differences increase, increasing as a square function. Thus, particular colors are effectively isolated.

In the listed program, the square function is operative for determination of selective terms RED, GRN and BLU for the three screen color values and selective terms CYN, MAG and YELL for the three ink color values. In addition, terms LTRED, PURP and BRN are determined for isolation of a light red color, a purple color and a brown color as indicated at lines 28-31, lines 56-59 and lines 60-63. An examination of the formulas by which the selective terms are developed show that they increase as a function of the fourth power of a screen color value, in the case of the light red term, and as a third power of a screen color value in the case of the purple and brown corrections terms.

Figure 4:
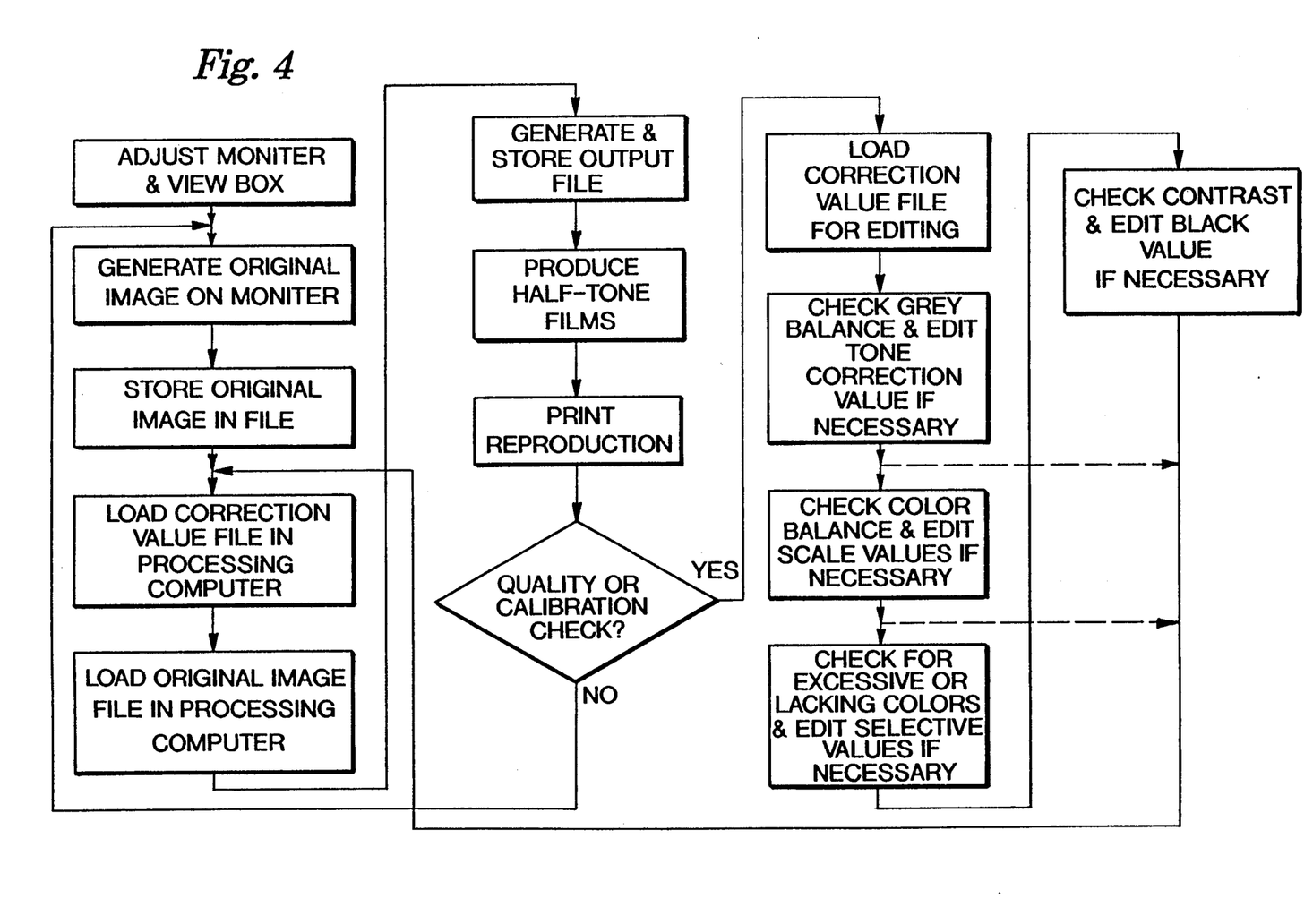
FIG. 4 is a schematic flow diagram illustrating basic operating procedures which are used in conjunction with the invention, also showing calibration procedures of the invention.

FIG. 4 illustrates overall procedures for use of the system of the invention and also illustrates calibration procedures of the invention. Initially, the monitor 11 and computer 12 are adjusted to obtain a white on the monitor screen 11a which matches that of printing stock as viewed in the view box 24. The intensity of illumination of the printing stock also be adjusted by adjusting the control knob 24a of the view box 24.

A desired image may then be generated on the monitor screen 11a, using a graphics program as aforementioned, and if desired, loading a stored image or images from a file. After developing an original image of the desired form, it may be stored. Then the processing operations may be performed, using the computer 16.

A file of correction values is loaded into the memory of the processing computer 16 and a stored original image may also be loaded into the memory of the processing computer 16. Then an output file is generated using a program which includes the steps as indicated in the program listing of TABLE I. Then half-tone films are produced and a printing operation is performed to obtain a reproduction of the original image.

As indicated in FIG. 1, the output file may be stored in a storage unit 17, transferred to a storage unit 19 and retrieved by a color processing system 20 of known form for operation of a half-tone film recorder 21. In a calibration or quality check operation, a reproduction so obtained may be compared with the original, using the view box 24 to display the reproduction under controlled lighting conditions while viewing the original on the screen 11a of the monitor 11, under the same controlled lighting conditions.

At this time, as indicated in FIG. 4, the correction value file which was used in generating the output file may be loaded into the computer 12 for editing. In the editing procedure, the reproduction may be checked for a grey balance, to determine whether a true grey is produced through a full range of greys in the original image, which may preferably be a test image having a full range of greys, for calibration checking. If the reproduction does not have a proper grey balance, the tone correction values may be adjusted.

As aforementioned, the system preferably uses look up table for tone correction and a calibration program loaded into the computer 12 may preferably include provisions for display of curves representing the contents of the three look up tables, with provisions also for editing of such curves and/or the contents of the look up tables. If, for example, the proper shades of grey are obtained in darker grey regions but the displayed reproduction has a reddish cast in the lighter regions of grey, adjustments may be made in the color correction values to increase the amount of magenta and/or reduce the amounts of cyan and yellow.

A contrast check and an edit of the black value, if necessary, are shown being made as the last step in the calibration procedure as shown in FIG. 4 but it will be understood that the black value may be edited any time it is necessary and if contrast is such as to interfere with other checks, a new test reproduction may be made before proceeding further with the calibration procedures. The contrast correction may be made by adjusting the value of the "BLKEN" black value which is multiplied by the grey factor gf and subtracted from the fixed value of 255 to obtain the black value, as indicated at line 24 of TABLE I.

If the reproduction has the proper grey balance, or if only relatively small changes are necessary, the reproduction may be checked for a basic balance in the reproduction of colors. If the basic colors do not seem to balance throughout the full range, appropriate adjustments may be made in the scale values "CBCOL", "CWCOL", "MVCOL", "MWCOL", "YBCOL", and "YWCOL" for the three output colors.

A check may also be made for a particular color which is excessive or lacking in the reproduction and which might require use or adjustment of the selective values for the various colors. In general, it is desirable that the system be adjusted for proper grey balance throughout the range and for proper contrast, before other adjustments and therefore, it is not desirable that either the scale values and particularly not the selective values be used prior to adjustment for reasonably accurate grey balance and contrast. It may be necessary to make a number of test reproductions after adjustment of corrections values.

However, as aforementioned, the system of the invention is such as to facilitate detection of errors and provides an orderly procedure which will directly converge to an accurate calibration, avoiding the need for an undue number of test operations. Once the system is calibrated, it may then be used for reproducing various original images as composed, without requiring further calibration procedures. Of course, a quality check may be periodically effected.

Since the correction data are stored in files, the system is also readily adaptable to for use when changes are made in printing inks or other conditions which are similar to although not identical to the conditions used in generating the calibration files.

In the system illustrated and described, the computer 12, used in conjunction with the graphics program is separate from the processing computer 16. A single computer may, of course, be used for both functions, especially if a multi-tasking mode of operation is available with the computer. It is also noteworthy that the computer used for processing and/or for graphics operations, may be used to perform functions of the color processing system 20 in the system as illustrated.

It will be understood that other modifications and variations may be effected without departing from the spirit and scope of the novel concepts of this invention.

I claim:

1. A method for controlling production of black and cyan, magenta and yellow chromatic colors in reproduction of images, comprising the steps of supplying original image digital data in the form of groups of input data each of which defines R, G and B values variable within a certain range and respectively corresponding to intensity values of red, green and blue component colors of an individual pixel of an original image, and digitally processing said groups of input data to produce from each group of input data a corresponding group of output digital data for control of reproduction of an individual pixel of said original image in at least three output colors, said processing of said groups of input data including the steps of determining from said R, G and B values for each original image pixel a grey factor corresponding to whichever of said R, G and B values represents the least effective intensity, determining an output black value as a function of said grey factor, producing cyan, magneta and yellow color values which are such as to obtain a color reproduction of each original image pixel having a color other than grey, and producing cyan, magenta and yellow output chromatic values from said color values for use with said output black value in reproduction of each said original image pixel, said producing of said cyan, magenta and yellow color values including the steps of determining from said R, G and B values a saturation factor corresponding to whichever of said R, G and B values represents the greatest intensity, and thereafter determining each of said cyan, magenta and yellow output color values as a direct function of calibration values and said grey factor, said saturation factor and said R, G and B values for each original image pixel to produce a tone correction for each pixel.

2. A method as defined in claim 1, wherein said producing of said output color values includes the steps of determining a cyan output value primarily as an inverse function of said R value and additionally as a function of cyan correction terms including a first tone correction term developed from a comparison of said R value with said grey and saturation factors, determining a magenta output value primarily as an inverse function of said G value and additionally as a function of magenta correction terms including a second tone correction term developed from a comparison of said G value with said grey and saturation factors, and determining a yellow output value primarily as an inverse function of said B value and additionally as a function of yellow correction terms including a third tone correction term developed from a comparison of said R value with said grey and saturation factors.

3. A method as defined in claim 2, wherein look-up tables are used in developing said first, second and third tone correction terms.

4. A method as defined in claim 2, wherein said cyan correction terms include a cyan color correction term developed as a function of a comparison of said R value with said G and B values and with said grey and saturation factors, wherein said magneta correction terms include a magenta color correction term developed as a function of a comparison of said G value with said R and B values and with grey saturation factors, and wherein said yellow correction terms include a yellow color correction term developed as a function of a comparison of said B value with said G and R values and with said grey and saturation factors.

5. Apparatus for controlling production of black and cyan, magenta and yellow chromatic colors in reproduction of images, comprising means for supplying original image digital data in the form of groups of input data each of which defines R, G and B values variable within a certain range and respectively corresponding to intensity values of red, green and blue component colors of an individual pixel of an original image, and processing means for digitally processing said groups of input data to produce from each group of input data a corresponding group of output digital data for control of reproduction of an individual pixel of said original image in at least three output colors, said processing means including means for determining from said R, G and B values for each original image pixel a grey factor corresponding to whichever of said R, G and B values represents the least effective intensity, means for determining an output black value as a function of said grey factor, color value producing means for producing cyan, magenta and yellow color values which are such as to obtain a color reproduction of each original image pixel having a color other than grey, and output means for producing from said cyan, magenta and yellow color values cyan, magenta and yellow output color values for use with said output black value in reproduction of each said original image pixel, said color value producing means comprising means for determining from said R, G and B values a saturation factor corresponding to whichever of said R, G and B values represents the greatest intensity, and means for producing each of said cyan, magenta and yellow color values as a direct function of calibration values, said grey factor, said saturation factor and said R, G and B values for each original image pixel to obtain a tone correction for each pixel.

6. Apparatus as defined in claim 5, wherein said output color producing means includes means for determining a cyan output value primarily as an inverse function of said R value and additionally as a function of cyan correction terms including a first tone correction term developed from a comparison of said R value with said grey and saturation factors, means for determining a magenta output value primarily as an inverse function of said G value and additionally as a function of magenta correction terms including a second tone correction term developed from a comparison of said G value with said grey and saturation factors, and means for determining a yellow output value primarily as an inverse function of said B value and additionally as a function of yellow correction terms including a third tone correction term developed from a comparison of said R value with said grey and saturation factors.

7. Apparatus as defined in claim 6, wherein said output color producing means includes look-up tables for use in developing said first, second and third tone correction terms.

8. Apparatus as defined in claim 6, wherein said cyan correction terms include a cyan color correction term developed as a function of a comparison of said R value with said G and B values and with said grey and saturation factors, wherein said magneta correction terms include a magenta color correction term developed as a function of a comparison of said G value with said R and B values and with said grey and saturation factors, and wherein said yellow correction terms include a yellow color correction term developed as a function of a comparison of said B value with said G and R values and with said grey and saturation factors.

* * * * *

UNITED STATES PATENT AND TRADEMARK OFFICE
CERTIFICATE OF CORRECTION

PATENT NO. : 5,018,085
DATED : May 21, 1991
INVENTOR(S) : Jack E. Smith, Jr.

It is certified that error appears in the above-indentified patent and that said Letters Patent is hereby corrected as shown below:

On the Title Page under item [56], References Cited -- "4,556,505" should be --4,656,505--; and the inventor's name "Faarina" should be --Farina--.
Column 15, line 13, after "with" add --said--; and after "grey" add --and--.

Signed and Sealed this

Fifteenth Day of June, 1993

Attest:

MICHAEL K. KIRK

*Attesting Officer*    *Acting Commissioner of Patents and Trademarks*